July 12, 1955  A. R. SPICACCI  2,712,970
SEAL
Filed June 22, 1953

INVENTOR
ATTILIO R. SPICACCI
BY
ATTORNEY

United States Patent Office 2,712,970
Patented July 12, 1955

2,712,970

SEAL

Attilio Regulus Spicacci, Lancaster, Pa.

Application June 22, 1953, Serial No. 363,051

1 Claim. (Cl. 308—187.2)

This invention is directed to a seal between relatively rotating members, such as in bearings, to prevent the entrance of contaminants and the retention of the lubricant in the bearing.

Ordinarily, the degree of effectiveness of seals depends very much on the degree of concentricity of the rotating member. In these cases the seal is fixed to either of the relatively rotating members of the bearing. When misalignment or looseness occurs, there is usually a variation in the contact pressure along the periphery of the seal contact. In extreme cases the misalignment or radial looseness may cause an opening at some part of the seal contact thereby destroying the effectiveness of the seal.

In some applications, for example agricultural implements, the misalignment of the bearing is inevitable. The initial internal looseness within the bearing then becomes a necessity in order to accommodate this misalignment if cramping of the bearing is to be avoided. Furthermore, the type of bearing for such applications is such that some internal wear of the bearing will take place in time. If an undue amount of contamination is allowed into the bearing or an excessive amount of lubricant is allowed to escape the bearing, the rate of bearing wear would be so high as to render the bearing inoperative in too short a period of time.

The object of the invention is to provide a continuous pressure contact between the rotating and the stationary members and to maintain such pressure contact equally effective when severe misalignment or looseness between the stationary and rotating members takes place.

Another object of the invention is to provide a sealing member which is sufficiently flexible and resilient so as to effect a sealing contact by its hoop tension between the stationary and rotating members regardless of their relatively changing position such as occurring during misalignment or looseness.

Another object of the invention is to provide the sealing member under a hoop tension unattached to either stationary or rotating members so as to facilitate the said sealing member to accommodate itself to the misaligning and looseness of the bearing.

It is a further object of the present invention to provide a rubber ring of circular cross-section which is placed in sealing position under tension with the tendency of the ring to contract serving to wedge the ring in sealing position, the continued tendency to contract causing the ring to follow the slightest movement of the bearing elements and to maintain an effective seal at all times.

It is a still further object of the present invention to provide a rubber ring seal of circular cross-section which will engage the stationary and movable parts of a bearing and effectively seal the small space between said stationary and moving parts during the operation of the bearing, regardless of wear or inherent misalignment of these parts.

The invention is illustrated in the accompanying drawing in which.

Figure 1:
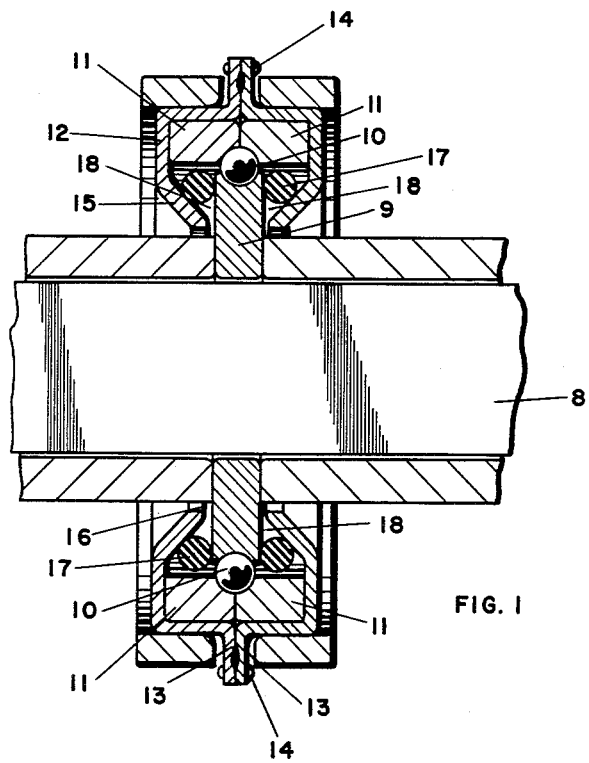
Figure 1 is a cross section showing the seal in one particular type of bearing.
Figure 2:
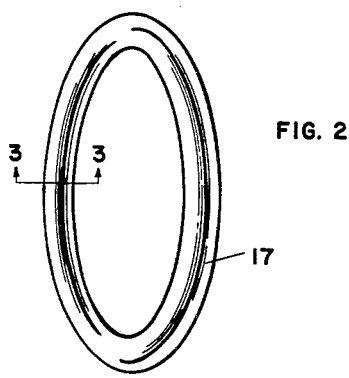
Figure 2 is a perspective of the sealing ring.
Figure 3:
Figure 3 is a section on line 3—3 of Figure 2.

Referring particularly to Figure 1, a square shaft 8 has mounted thereon an inner race 9 which carries ball bearings 10.

A split outer race 11 is enclosed by retaining shells 12 which are formed of two circular sections having outwardly turned flanges 13 and held together by welding or by rivets 14. The inner edges of the retaining shells are bent inwardly at an angle, as shown at 15, to a position so that the inner edges 16 almost touch the rotating inner race 9.

The angle at which the inner edges 15 are bent should be maintained at approximately 35° with the inner raceway. This forms a trough 18 between the inner raceway and the inwardly turned edges of the retainer, one side formed by the raceway and the other by the sloping side of the inward turned edges. Into this trough 18 a rubber ring of circular cross-section is introduced.

During the assembly of the bearing, the rubber ring 17 is stretched over the inward turned edges and assembled with a slight tension so that there is a tendency for the rubber ring to contract, which tendency forces said ring 17 into engagement with the inward sloping side of the inturned edges of the retainer and the rotating inner race. This tension on the rubber ring causes the ring to constantly engage the two sides of the trough without regard for any apparent looseness between the parts or due to a slight misalignment or to wear during use of the bearing.

The ring seal is sufficiently elastic and flexible so that when it is placed in hoop tension between the rotating and stationary elements, it forms a wedge which creates an excellent seal whether or not misalignment and radial looseness is excessive. This wedge contact of the O-ring is maintained regardless of the misalignment and radial looseness or axial motion because the stretched ring constantly bears on the edges of the trough retaining the lubricant and preventing the contaminants from entering into the bearing housing.

What is claimed is:

A seal for ball bearings of the type having a rotating inner race, an outer race comprising, a pair of identical shells combined to form both a support for said outer race and a lubricant housing, the inner edges of said shells being bent at an angle of approximately 35° to the sides of the inner race to form a pair of troughs, one on each side of said inner race, a rubber ring of circular cross-section mounted in each of said troughs under tension and in contact with the sides of the trough.

References Cited in the file of this patent

UNITED STATES PATENTS

| 2,022,252 | Miltenberger | Nov. 26, 1935 |
| 2,298,463 | Burt | Oct. 13, 1942 |
| 2,570,117 | Hallstrand | Oct. 2, 1951 |